United States Patent
Mleczko et al.

(10) Patent No.: US 10,986,313 B2
(45) Date of Patent: *Apr. 20, 2021

(54) METHOD OF ASSEMBLING A VEHICULAR CAMERA HAVING A SPRING-LOADED ELECTRICAL CONNECTOR

(71) Applicant: MAGNA ELECTRONICS INC., Auburn Hills, MI (US)

(72) Inventors: Jamie A. Mleczko, Washington, MI (US); Jonathan D. Conger, Berkley, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,742

(22) Filed: Mar. 16, 2020

(65) Prior Publication Data

US 2020/0221053 A1 Jul. 9, 2020

Related U.S. Application Data

(63) Continuation of application No. 16/383,995, filed on Apr. 15, 2019, now Pat. No. 10,594,982, which is a
(Continued)

(51) Int. Cl.
*B60Q 1/00* (2006.01)
*H04N 7/18* (2006.01)
(Continued)

(52) U.S. Cl.
CPC .............. *H04N 7/18* (2013.01); *B60N 2/002* (2013.01); *B60Q 1/1423* (2013.01); *B60Q 9/008* (2013.01);
(Continued)

(58) Field of Classification Search
CPC ...... H04N 7/18; H04N 13/239; H04N 5/2257; H04N 7/183; B60N 2/002; B60Q 1/1423;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

*Primary Examiner* — Kerri L McNally
*Assistant Examiner* — Thang D Tran
(74) *Attorney, Agent, or Firm* — Honigman LLP

(57) ABSTRACT

A method of assembling a vehicular camera includes providing a front camera housing including a lens and an imager, providing a rear camera housing, and a PCB. The rear camera housing includes a spring-loaded electrical connector and the PCB has first and second electrically conductive traces. The spring-loaded electrical includes inner and outer electrically conductive terminals that are movable relative to the base portion and are spring-biased towards an extended state and are compressible towards a compressed state. The rear camera housing is moved toward engagement with the front camera housing so that the terminals, in their extended state, engage the traces. The rear camera housing is attached at the front camera housing so that the terminals compress towards their compressed state. After the rear camera housing is attached at the front camera housing, the terminals are in spring-biased electrical connection with the traces at the PCB.

24 Claims, 6 Drawing Sheets

Related U.S. Application Data continuation of application No. 15/722,145, filed on Oct. 2, 2017, now Pat. No. 10,264,219.

(60) Provisional application No. 62/403,456, filed on Oct. 3, 2016.

(51) Int. Cl.

| | | |
|---|---|---|
| *B60N 2/00* | (2006.01) | |
| *B60Q 1/14* | (2006.01) | |
| *B60R 1/08* | (2006.01) | |
| *B60R 1/12* | (2006.01) | |
| *B60R 11/04* | (2006.01) | |
| *B60Q 9/00* | (2006.01) | |
| *H04N 5/225* | (2006.01) | |
| *H04N 13/239* | (2018.01) | |

(52) U.S. Cl.
CPC ............... *B60R 1/088* (2013.01); *B60R 1/12* (2013.01); *B60R 11/04* (2013.01); *H04N 5/2257* (2013.01); *H04N 7/183* (2013.01); *H04N 13/239* (2018.05)

(58) Field of Classification Search
CPC ........... B60Q 9/088; B60R 1/008; B60R 1/12; B60R 11/04
USPC ......................................................... 340/461
See application file for complete search history.

(56) References Cited

U.S. PATENT DOCUMENTS

| | | | |
|---|---|---|---|
| 5,791,911 A | 8/1998 | Fasano et al. | |
| 5,949,331 A | 9/1999 | Schofield et al. | |
| 6,485,081 B1* | 11/2002 | Bingle | E05B 83/26 |
| | | | 292/DIG. 43 |
| 7,965,336 B2* | 6/2011 | Bingle | B60R 16/03 |
| | | | 348/374 |
| 8,503,061 B2 | 8/2013 | Uken et al. | |
| 8,542,451 B2* | 9/2013 | Lu | B60R 11/04 |
| | | | 359/819 |
| 8,866,907 B2 | 10/2014 | McElroy et al. | |
| 9,066,446 B1 | 6/2015 | Olsson et al. | |
| 9,233,641 B2 | 1/2016 | Sesti et al. | |
| 9,609,757 B2 | 3/2017 | Steigerwald | |
| 9,623,799 B2 | 4/2017 | Bingle et al. | |
| 10,264,219 B2* | 4/2019 | Mleczko | B60Q 9/008 |
| 10,594,982 B2* | 3/2020 | Mleczko | H04N 13/239 |
| 2001/0048215 A1 | 12/2001 | Breed et al. | |
| 2004/0196577 A1* | 10/2004 | Carter | G02B 7/182 |
| | | | 359/871 |
| 2006/0208169 A1* | 9/2006 | Breed | G06K 9/00624 |
| | | | 250/221 |
| 2010/0097519 A1* | 4/2010 | Byrne | H04N 5/2253 |
| | | | 348/373 |
| 2011/0310248 A1* | 12/2011 | McElroy | H04N 5/2254 |
| | | | 348/148 |
| 2012/0327234 A1* | 12/2012 | Fish, Jr. | B60R 11/04 |
| | | | 348/148 |
| 2013/0107068 A1 | 5/2013 | Kim et al. | |
| 2013/0222595 A1 | 8/2013 | Gebauer et al. | |
| 2013/0242099 A1* | 9/2013 | Sauer | H04N 5/2251 |
| | | | 348/148 |
| 2013/0328672 A1* | 12/2013 | Sesti | B60Q 9/008 |
| | | | 340/435 |
| 2013/0344736 A1* | 12/2013 | Latunski | H01R 13/521 |
| | | | 439/587 |
| 2014/0061438 A1* | 3/2014 | Rohde | H04N 5/2251 |
| | | | 250/208.1 |
| 2014/0103624 A1 | 4/2014 | Breed | |
| 2014/0138140 A1 | 5/2014 | Sigle | |
| 2014/0320636 A1 | 10/2014 | Bally et al. | |
| 2014/0362209 A1 | 12/2014 | Ziegenspeck et al. | |
| 2014/0373345 A1* | 12/2014 | Steigerwald | B60R 1/04 |
| | | | 29/739 |
| 2015/0222795 A1* | 8/2015 | Sauer | H04N 5/2257 |
| | | | 348/148 |
| 2015/0264234 A1* | 9/2015 | Wang | H04N 5/2254 |
| | | | 348/148 |
| 2015/0266430 A1* | 9/2015 | Mleczko | H04N 5/2257 |
| | | | 348/148 |
| 2015/0325964 A1* | 11/2015 | Kunieda | H01R 24/38 |
| | | | 439/578 |
| 2015/0335230 A1 | 11/2015 | Tomatsu | |
| 2015/0340816 A1* | 11/2015 | Abe | H01R 13/42 |
| | | | 439/607.34 |
| 2015/0365569 A1 | 12/2015 | Mai et al. | |
| 2016/0037028 A1 | 2/2016 | Biemer | |
| 2016/0195616 A1* | 7/2016 | Gilliland | G01S 17/894 |
| | | | 356/5.01 |
| 2016/0268716 A1* | 9/2016 | Conger | H04N 7/18 |
| 2017/0133811 A1 | 5/2017 | Conger et al. | |
| 2018/0048100 A1 | 2/2018 | Moilanen | |

\* cited by examiner

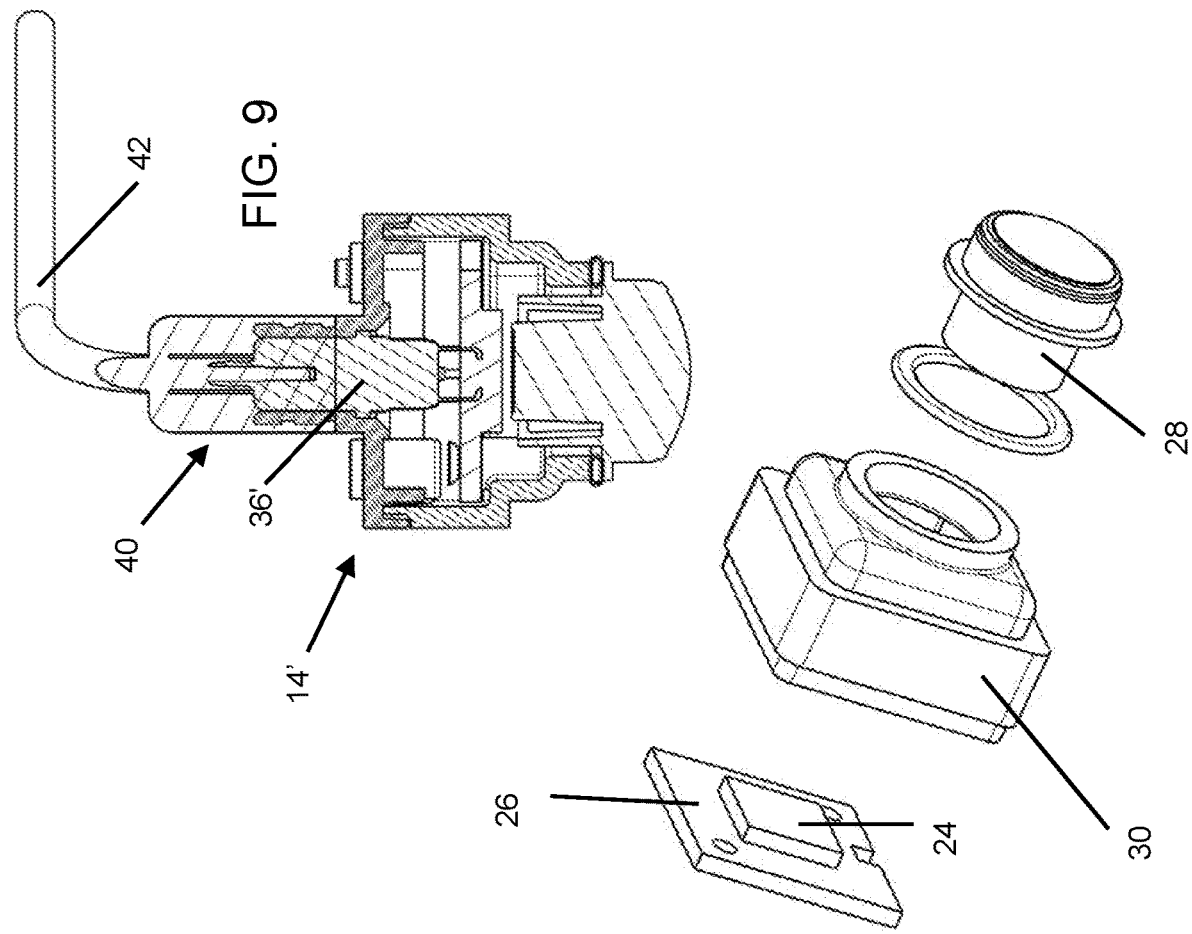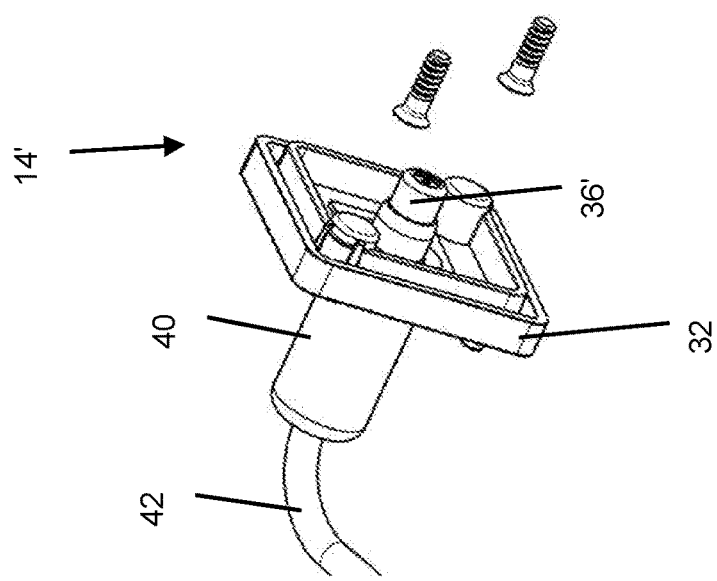

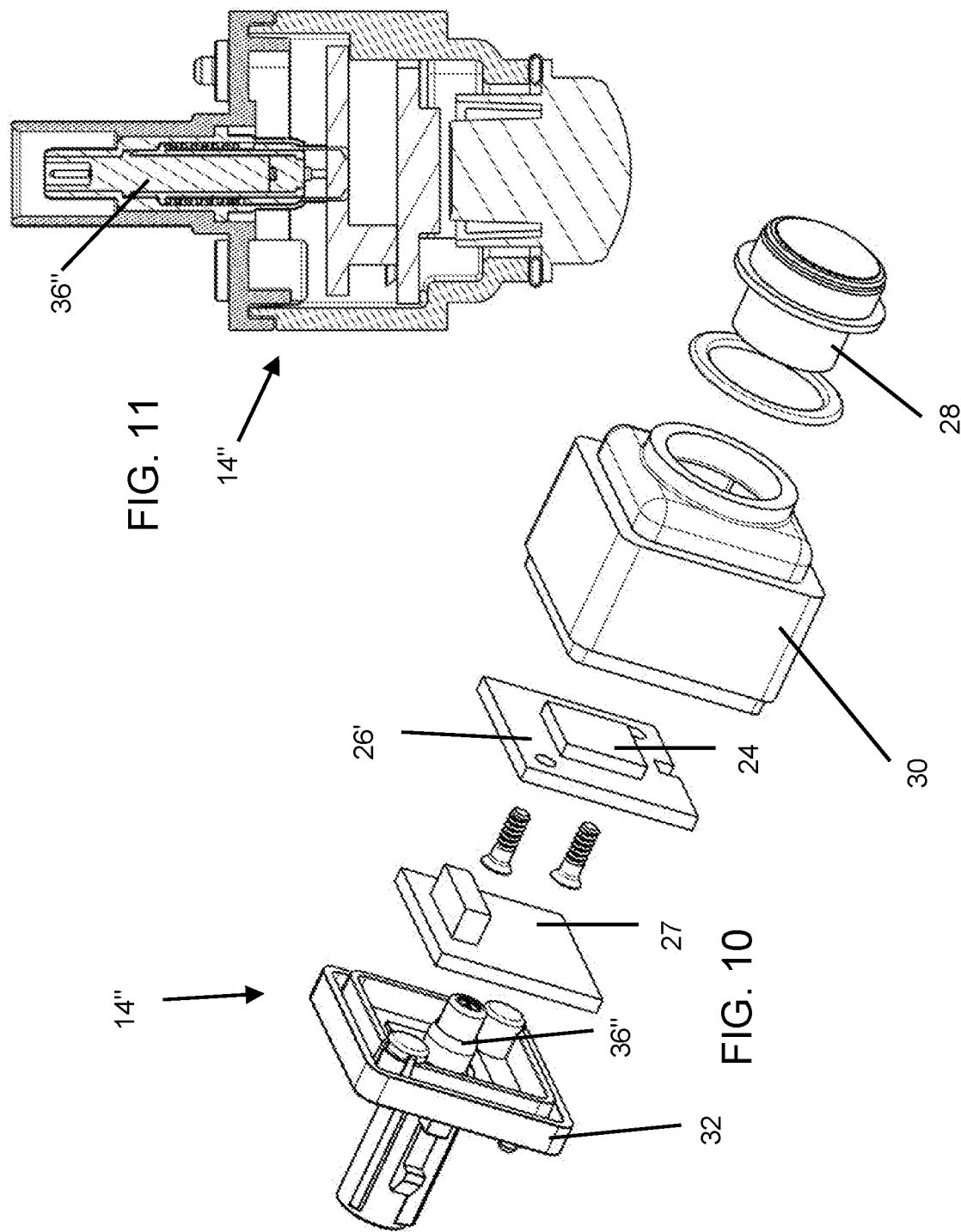

METHOD OF ASSEMBLING A VEHICULAR CAMERA HAVING A SPRING-LOADED ELECTRICAL CONNECTOR

CROSS REFERENCE TO RELATED APPLICATIONS

The present application is a continuation of U.S. patent application Ser. No. 16/383,995, filed Apr. 15, 2019, now U.S. Pat. No. 10,594,982, which is a continuation of U.S. patent application Ser. No. 15/722,145, filed Oct. 2, 2017, now U.S. Pat. No. 10,264,219, which claims the filing benefits of U.S. provisional application Ser. No. 62/403,456, filed Oct. 3, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vehicle camera, such as for a driver assistance system or vision system or imaging system for a vehicle, that captures image data representative of images exterior of the vehicle. The camera includes a spring-biased or spring-loaded electrical connector that electrically connects between a connector portion of the camera (configured to electrically connect to a wire harness of the vehicle or the like) and circuit pads or contacts at a circuit board of the camera. The electrical connector has an inner terminal and an outer terminal (that circumscribes the inner terminal and that is electrically isolated from the inner terminal) that engage respective inner and outer contacts at the circuit board. The spring-loaded electrical connector is initially extended and compresses as the terminals contact the contacts at the circuit board during assembly of the camera, where the spring-loaded electrical connector accommodates for axial tolerances and the contacts may be configured to accommodate lateral tolerances.

These and other objects, advantages, purposes and features of the present invention will become apparent upon review of the following specification in conjunction with the drawings.

BRIEF DESCRIPTION OF THE DRAWINGS

FIG. 8 is an exploded perspective view of another camera having a spring-loaded electrical connector, shown with the camera having a wire harness;

FIG. 9 is a sectional view of the camera of FIG. 8;

FIG. 10 is an exploded perspective view of a camera having a spring-loaded electrical connector, shown with the camera having dual printed circuit boards; and FIG. 11 is a sectional view of the camera of FIG. 10.

DESCRIPTION OF THE PREFERRED EMBODIMENTS

A camera for vehicle vision system and/or driver assist system and/or object detection system operates to capture images exterior of the vehicle and a processor may process the captured image data to display images and/or to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
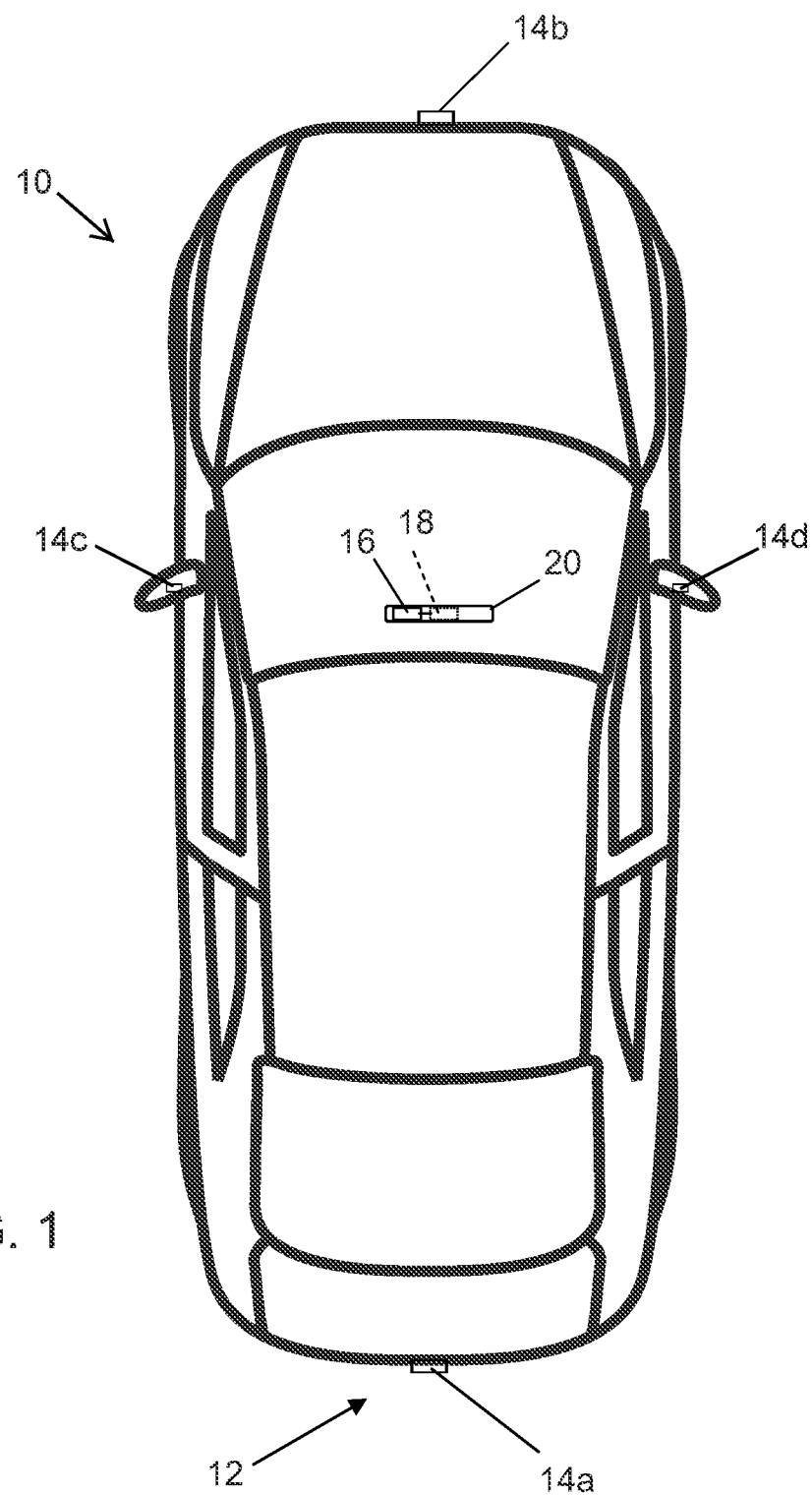
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 3:
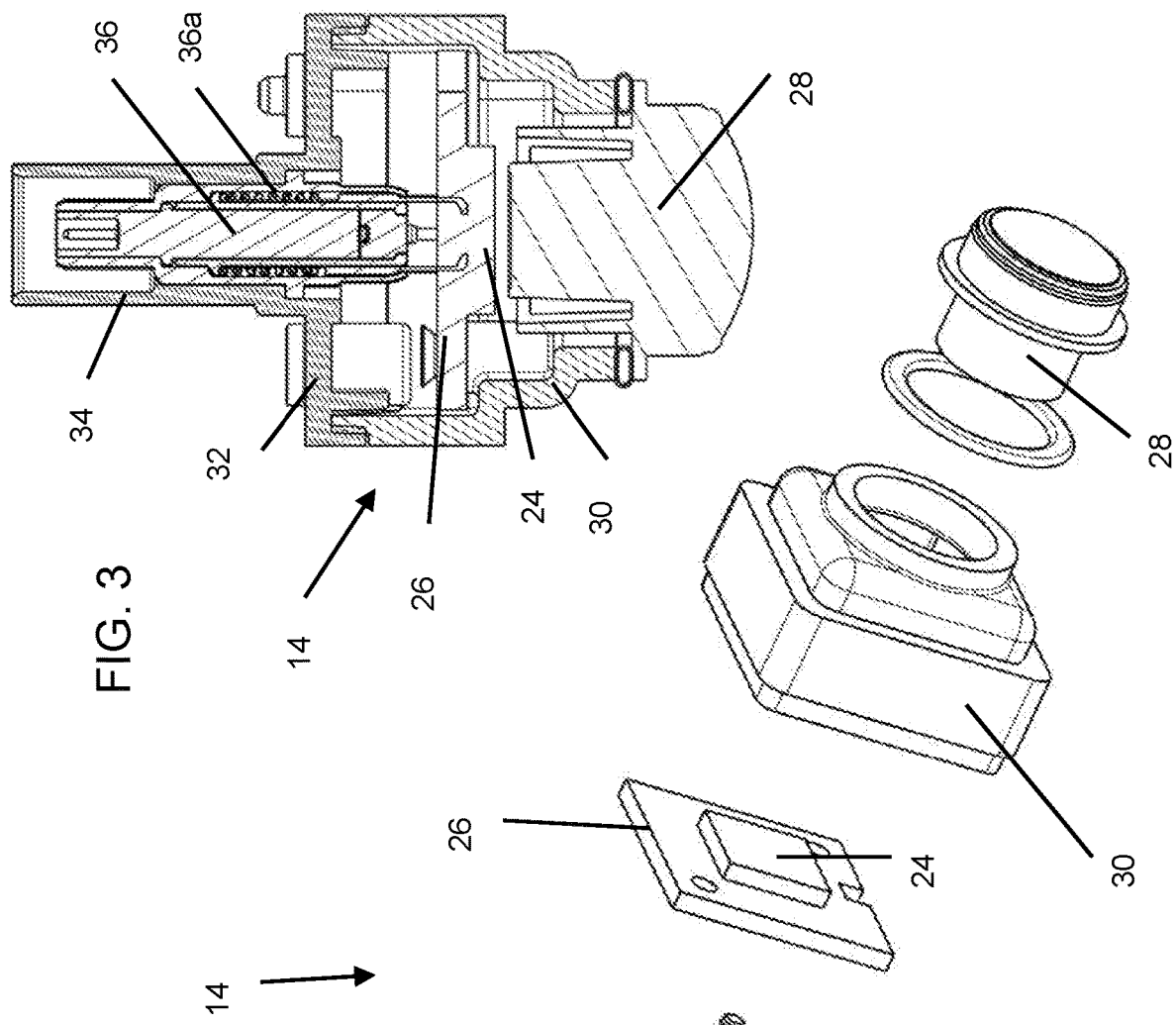
FIG. 3 is a sectional view of the camera of FIG. 2.
Figure 2:
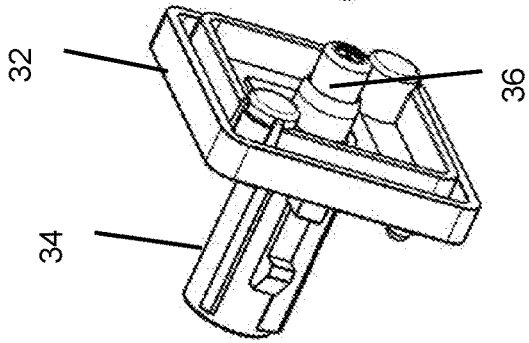
FIG. 2 is an exploded perspective view of a camera having a spring-loaded electrical connector.

As shown in FIGS. 2 and 3, the camera 14 comprises an imager 24 disposed at a circuit element or printed circuit board 26 (PCB) and a lens barrel 28 (that houses or supports a lens thereat) that is optically aligned and focused at the imager when the camera is assembled. The circuit element 26 is disposed at the rear of a front camera housing 30 and may be fastened to or bonded to the front camera housing 30.

The front camera housing 30 receives the lens barrel thereat (and may be adhesively bonded to the lens barrel after the lens is optically aligned with the imager, such as by utilizing aspects of the cameras and methods described in U.S. Pat. Nos. 9,451,138; 9,277,104 and/or 8,542,451, which are hereby incorporated herein by reference in their entireties). A rear camera housing 32 is mated at a rear of the front camera housing 30 to encase the circuit element and imager in the camera housing. The rear camera housing 32 includes a connector portion 34 (such as a plastic plug or socket portion configured to connect to a connector of a wire harness of the vehicle), with a spring-loaded or spring-biased electrical connector 36 disposed therein and adjustable to engage circuitry or pads of the circuit element 26 and maintain engagement during and after assembly of the camera, as discussed below.

Figure 4:
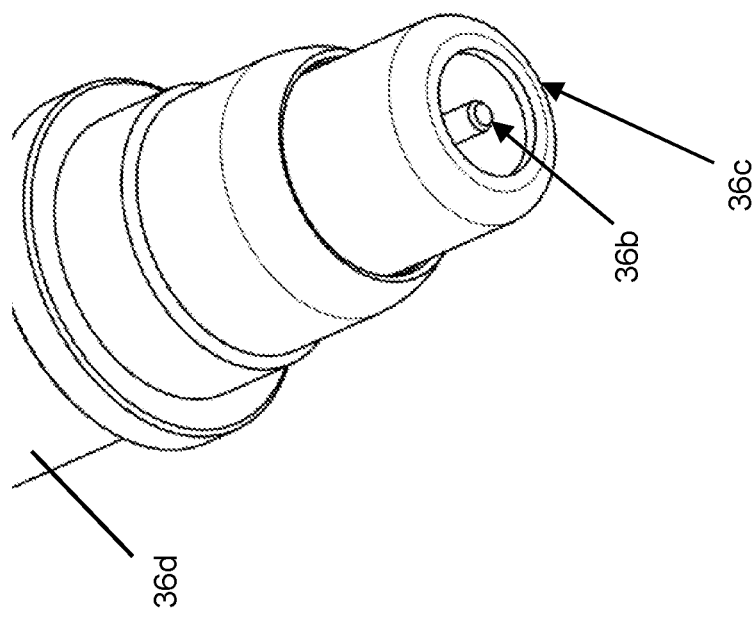
FIG. 4 is an enlarged perspective view of a contact end of the spring-loaded electrical connector.

The spring-loaded electrical connector or terminal 36 comprises an inner contact and an outer contact (see FIG. 4), both electrically conductive and electrically insulated from each other. Both contacts are spring loaded and are able to be compressed in an axial direction independently from each other (in other words, the inner contact may move relative to the outer contact). The outer contact fully encompasses the inner contact so as to create a shield around the inner contact. The outer contact may have interface features for mounting and may electrically contact the mounting structure or geometry if desired. The mating un-sprung end of the terminal may have an interface designed to mate to various industry standard high speed data interfaces, as discussed below.

Figure 5:
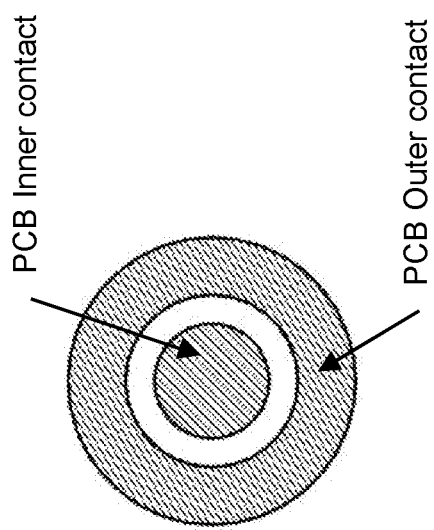
FIG. 5 is a plan view of the inner and outer contacts or pads at the printed circuit board of the camera.

As can be seen in FIG. 3, the spring-loaded connector or terminal 36 is installed into the rear camera housing, where a spring or springs 36a urges the inner contact 36b and outer contact 36c outward towards the circuit element where the contacts react against the PCB surface which has exposed electrically conductive pads (see FIG. 5). The inner and outer diameters of each of the conductive pads provides a width or area of the pads that is larger than the size of the contact surface area of the respective terminals so as to allow for side-to-side translation (XY compliance) of the PCB relative to the camera housing, while the spring action of the pin allows for axial translation (Z compliance) of the terminals relative to the PCB. The camera construction may use ultrasonic welding or may be joined via other joining methods or means, such as adhesive or laser welding could also or otherwise be used. The drawings show an example of a camera construction with focus adhesive external to the camera, but the connection method described here could also be used on cameras with the focus adhesive internal to the camera or on cameras that do not use adhesive for focus but use some other means to maintain focus.

Optionally, the housing and/or the lens holder may comprise a thermally conductive plastic or metal to dissipate heat. If the housing is electrically conductive, the spring-loaded terminal may contact the housing for EMI isolation. If it is not electrically conductive, a metalized coating may be added to the housing, which would then make contact with the spring-loaded terminal.

Figure 7:
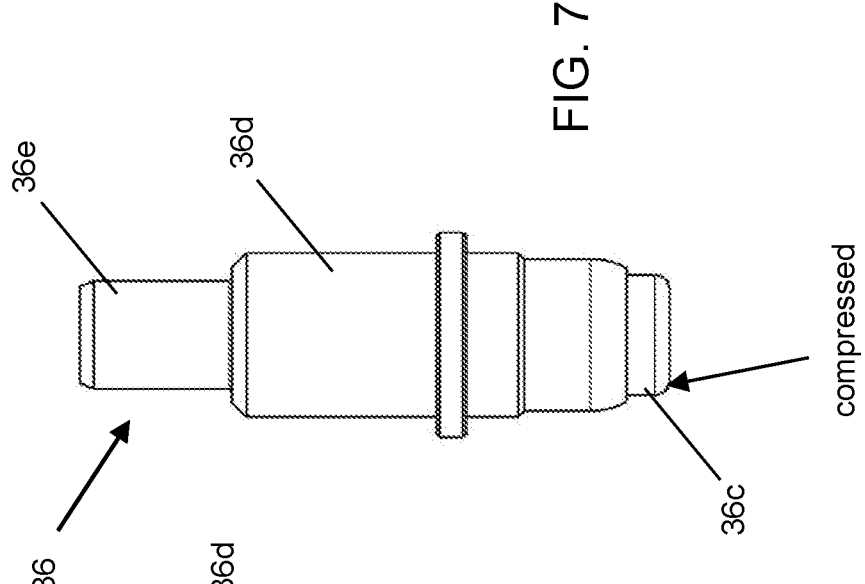
FIG. 7 is another side elevation of the spring-loaded electrical connector, shown in a compressed state.
Figure 6:
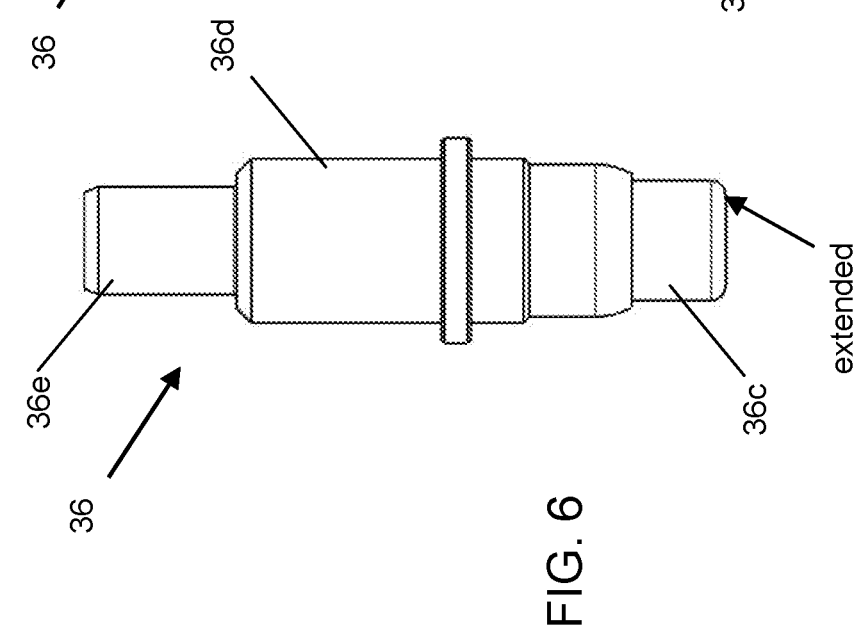
FIG. 6 is a side elevation of the spring-loaded electrical connector, shown in an extended state.

The spring-loaded electrical connector 36 may be attached at the rear camera housing via any suitable means. For example, a base portion 36d (FIGS. 6 and 7) of the electrical connector 36 may be press-fit into the connector portion 34 of the rear camera housing 32 or may snap-attach (or otherwise attach) at the connector portion 34, whereby the inner and outer terminals 36b, 36c extend from and are spring-biased outward from the base portion 36d. The terminals 36b, 36c are thus movable (extendable and compressible) relative to the base portion 36d, which is fixedly attached at the rear camera housing, such that the terminals extend from the rear camera housing and engage the PCB at the front camera housing when the camera housings are joined together during assembly of the camera.

The joint between the front camera housing (or lens holder) and rear camera housing (or cover) may be closed via laser welding, ultrasonic welding or adhesive, or the housings or portions may be fastened together (such as via one or more screws) with a gasket. The lens holder or front camera housing may be deep (i.e., may have a deeper cavity or recess than the cavity or recess of the rear camera housing), putting the joint at or near the rear of the camera, or alternatively the rear cover or rear camera housing may be deep (i.e., may have a deeper cavity or recess than the cavity or recess of the lens holder or front camera housing), putting the joint at or near the front of the camera. There are benefits to each such as heat dissipation or ease of assembly. The joining means may comprise any suitable joining means so as to hold the front and rear camera housings together and to limit or preclude water or moisture ingress into the camera housing.

The spring-loaded terminal or pin or connector 36 may have any required mating geometry at the other end 36e (the end opposite the contact surfaces that engage and contact the pads at the PCB). For example, the spring-loaded connector 36 in FIG. 3 has an SMB interface 36e for a Fakra connector. Optionally, and such as shown in FIGS. 8 and 9, there may be a coaxial wire crimp 40 for a camera 14' that contains a harness 42, with the spring-loaded connector or terminal 36' disposed at the wire crimp and electrically connected to wires or conductive elements of the harness. The joining method of the harness may be done by overmolding, or it may be a separately fastened piece. Optionally, and such as shown in FIGS. 10 and 11, a spring-loaded connector or terminal 36" may be suitable for use for a camera 14" having dual circuit boards or PCBs (shown with the front camera housing being deeper to accommodate the dual circuit boards), where the spring-loaded terminal 36" is urged into engagement with circuit pads at the rear of a rear circuit board 27, which is electrically connected to an imager circuit board 26'. The cameras 14, 14', 14" are otherwise similar and are shown with like reference numbers for common or similar elements, such that a detailed discussion of the cameras need not be repeated herein.

Thus, the camera includes a spring-loaded or spring-biased electrical connector or terminal that is disposed at a connector portion of a rear camera housing and that has an outer connector or terminal or contact and an inner connector or terminal or contact that are urged towards and into engagement with respective outer and inner contacts or pads at a printed circuit board of the camera. The spring-bias of the terminals of the connector maintains electrical connection between the inner and outer terminals and the respective PCB contacts and allows for or accommodates tolerances in the location of the PCB relative to the rear camera housing. The PCB contacts may also be sized to allow for lateral movement of the contacts of the spring-loaded connector relative to the PCB to allow for or accommodate side-to-side location tolerances of the PCB relative to the rear camera housing.

Any suitable electrically connecting surfaces may be used to electrically connect the contact ends of the connector terminals with the respective PCB contacts. Optionally, the interface surfaces of the inner and outer contacts may be changed or adapted or configured as desired without departing from the principles of the present invention. For example, a smooth surface may be desired at the contact end for contacting an ENIG (Electroless nickel immersion gold) plated PCB, or a jagged or serrated edge or surface may be desired at the contact end for biting or digging into solder that has been reflowed over the PCB electrical contacts.

Thus, the camera and assembly process of the present invention provides a camera with enhanced electrical connection to circuitry of the camera circuit board. The connector provides enhanced electrical connection between a coaxial connector of a vehicle wire or cable and the circuitry via the spring-biased terminals or elements of the connector.

A method of assembling the vehicular vision system camera includes providing a lens comprising a plurality of optical elements and disposing the lens in a lens barrel, and providing a front camera housing, a rear camera housing, and a printed circuit board having an imager disposed thereat. A spring-loaded electrical connector is disposed at the rear camera housing, such as via a press-fit engagement or via overmolding a portion of the rear camera housing over the spring-loaded electrical connector. The spring-loaded electrical connector comprises an inner terminal and an outer terminal for connecting to respective ones of an inner contact and an outer contact at the printed circuit board, with the outer terminal circumscribing the inner terminal. The inner and outer terminals of the electrical connector are spring-biased towards an extended state and compressible towards a compressed state. The lens barrel is accommodated at the front camera housing and the printed circuit board is disposed at the front camera housing. The assembly process includes attaching the rear camera housing at the front camera housing to enclose the printed circuit board within the camera with the lens optically aligned with the imager. The step of attaching the rear camera housing at the front camera housing comprises (i) moving the rear camera housing toward engagement with the front camera housing so that the inner and outer terminals of the electrical connector, in their extended state, engage the inner and outer contacts at the printed circuit board, and (ii) engaging the rear camera housing with the front camera housing so that the inner and outer terminals of the electrical connector compress towards their compressed state. After the rear camera housing is attached at the front camera housing, the inner and outer terminals of the electrical connector are in spring-biased electrical connection with the inner and outer contacts at the printed circuit board.

The camera may utilize aspects of the cameras and systems described in U.S. Publication Nos. US-2017-0205679; US-2017-0129419; US-2017-0054881; US-2017-0048463 and/or US-2015-0365569, which are hereby incorporated herein by reference in their entireties.

The camera may include aspects of other electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811 and/or US-2017-0201661, and/or U.S. patent application Ser. No. 15/487,459, filed Apr. 14, 2017, and/or Ser. No. 15/478,274, filed Apr. 4, 2017, now U.S. Pat. No. 10,142,532, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535;

US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of assembling a vehicular camera, the method comprising:
   providing a front camera housing, wherein the front camera housing includes a lens having a plurality of optical elements;
   providing a rear camera housing having a spring-loaded electrical connector disposed thereat, wherein the spring-loaded electrical connector comprises (i) a base portion fixedly disposed at the rear camera housing, (ii) an inner electrically conductive terminal and (iii) an outer electrically conductive terminal that circumscribes the inner electrically conductive terminal and that is electrically isolated from the inner electrically conductive terminal, and wherein the inner electrically conductive terminal and the outer electrically conductive terminal of the spring-loaded electrical connector are movable relative to the base portion and are spring-biased towards an extended state and are compressible towards a compressed state;
   providing a printed circuit board having an imager disposed at a first side and having an inner electrically conductive trace and an outer electrically conductive trace disposed at a second side that is opposite the first side, wherein the outer electrically conductive trace circumscribes the inner electrically conductive trace and is electrically isolated from the inner electrically conductive trace;
   disposing the printed circuit board at the front camera housing and optically aligning the lens with the imager;
   attaching the rear camera housing at the front camera housing to enclose the printed circuit board in a cavity formed between the front camera housing and the rear camera housing;
   wherein attaching the rear camera housing at the front camera housing comprises (i) moving the rear camera housing toward engagement with the front camera housing so that the inner electrically conductive terminal and the outer electrically conductive terminal of the spring-loaded electrical connector, in their extended state, engage the inner electrically conductive trace and the outer electrically conductive trace at the printed circuit board, respectively, and (ii) attaching the rear camera housing at the front camera housing so that the inner electrically conductive terminal and the outer electrically conductive terminal of the spring-loaded electrical connector compress towards their compressed state; and
   after the rear camera housing is attached at the front camera housing, the inner electrically conductive terminal and the outer electrically conductive terminal of the spring-loaded electrical connector are in spring-biased electrical connection with the inner electrically conductive trace and the outer electrically conductive trace at the printed circuit board, respectively.

2. The method of claim 1, wherein the spring-loaded electrical connector comprises a cable connecting end that is opposite the inner and outer electrically conductive terminals and that is configured to electrically connect to a coaxial connector of a coaxial cable of a vehicle equipped with the assembled vehicular camera.

3. The method of claim 1, wherein the base portion of the spring-loaded electrical connector is press-fit at the rear camera housing.

4. The method of claim 1, wherein the spring-loaded electrical connector is disposed at the rear camera housing via overmolding a portion of the rear camera housing over the base portion of the spring-loaded electrical connector.

5. The method of claim 1, wherein the inner electrically conductive terminal comprises an inner contact surface at its end that is distal from the base portion, and wherein the outer electrically conductive terminal comprises an outer contact surface at its end that is distal from the base portion.

6. The method of claim 5, wherein, as the rear camera housing is moved toward engagement with the front camera housing, (i) the inner contact surface of the inner electrically conductive terminal of the spring-loaded electrical connector moves toward and into contact with the inner electrically conductive trace at the printed circuit board, and (ii) the outer contact surface of the outer electrically conductive terminal of the spring-loaded electrical connector moves toward and into contact with the outer electrically conductive trace at the printed circuit board.

7. The method of claim 6, wherein, as the rear camera housing is moved into engagement with the front camera housing, the inner and outer electrically conductive terminals of the spring-loaded electrical connector compress towards their compressed state and, after the rear camera housing is attached at the front camera housing, are in spring-biased electrical connection with the inner and outer electrically conductive traces at the printed circuit board, respectively.

8. The method of claim 7, wherein, with the rear camera housing attached at the front camera housing, and with the inner and outer contact surfaces of the inner and outer electrically conductive terminals in spring-biased electrical connection with the inner and outer electrically conductive traces at the printed circuit board, electrical connection integrity is maintained via spring-biased direct contact of the inner and outer contact surfaces to the inner and outer electrically conductive traces without soldering at the printed circuit board of the inner and outer contact surfaces.

9. The method of claim 1, wherein the inner and outer electrically conductive terminals are individually spring-biased relative to the base portion via respective springs.

10. The method of claim 1, wherein the inner and outer electrically conductive traces are dimensioned to accommodate lateral tolerances to allow for lateral variations in electrical connection with the inner and outer electrically conductive terminals, respectively.

11. A method of assembling a vehicular camera, the method comprising:
providing a front camera housing, wherein the front camera housing includes a lens having a plurality of optical elements;
providing a rear camera housing having a spring-loaded electrical connector disposed thereat, wherein the spring-loaded electrical connector comprises (i) a base portion fixedly disposed at the rear camera housing, (ii) an inner electrically conductive terminal and (iii) an outer electrically conductive terminal that circumscribes the inner electrically conductive terminal and that is electrically isolated from the inner electrically conductive terminal, and wherein the inner electrically conductive terminal and the outer electrically conductive terminal of the spring-loaded electrical connector are movable relative to the base portion and are spring-biased towards an extended state and are compressible towards a compressed state;
providing an imager printed circuit board and a connector printed circuit board, wherein circuitry of the imager printed circuit board is electrically connected with circuitry of the connector printed circuit board;
wherein the imager printed circuit board has a first side and a second side, and wherein the circuitry of the imager printed circuit board comprises an imager disposed at the first side thereof;
wherein the connector printed circuit board has a first side and a second side, and wherein the circuitry of the connector printed circuit comprises an inner electrically conductive trace and an outer electrically conductive trace are disposed at the second side of the connector printed circuit board, and wherein the outer electrically conductive trace circumscribes the inner electrically conductive trace and is electrically isolated from the inner electrically conductive trace;
disposing the imager printed circuit board at the front camera housing and optically aligning the lens with the imager;
attaching the rear camera housing at the front camera housing to enclose the imager printed circuit board and the connector printed circuit board in a cavity formed between the front camera housing and the rear camera housing;
wherein attaching the rear camera housing at the front camera housing comprises (i) moving the rear camera housing toward engagement with the front camera housing so that the inner electrically conductive terminal and the outer electrically conductive terminal of the spring-loaded electrical connector, in their extended state, engage the inner electrically conductive trace and the outer electrically conductive trace at the second side of the connector printed circuit board, respectively, and (ii) attaching the rear camera housing at the front camera housing so that the inner electrically conductive terminal and the outer electrically conductive terminal of the spring-loaded electrical connector compress towards their compressed state; and
after the rear camera housing is attached at the front camera housing, the inner electrically conductive terminal and the outer electrically conductive terminal of the spring-loaded electrical connector are in spring-biased electrical connection with the inner electrically conductive trace and the outer electrically conductive trace at the second side of the connector printed circuit board, respectively.

12. The method of claim 11, wherein the spring-loaded electrical connector comprises a cable connecting end that is opposite the inner and outer electrically conductive terminals and that is configured to electrically connect to a coaxial connector of a coaxial cable of a vehicle equipped with the assembled vehicular camera.

13. The method of claim 11, wherein the base portion of the spring-loaded electrical connector is press-fit at the rear camera housing.

14. The method of claim 11, wherein the spring-loaded electrical connector is disposed at the rear camera housing via overmolding a portion of the rear camera housing over the base portion of the spring-loaded electrical connector.

15. The method of claim 11, wherein the inner electrically conductive terminal comprises an inner contact surface at its end that is distal from the base portion, and wherein the outer electrically conductive terminal comprises an outer contact surface at its end that is distal from the base portion.

16. The method of claim 15, wherein, as the rear camera housing is moved toward engagement with the front camera housing, (i) the inner contact surface of the inner electrically conductive terminal of the spring-loaded electrical connector moves toward and into contact with the inner electrically conductive trace at the second side of the connector printed circuit board, and (ii) the outer contact surface of the outer electrically conductive terminal of the spring-loaded electrical connector moves toward and into contact with the outer electrically conductive trace at the second side of the connector printed circuit board.

17. The method of claim 16, wherein, as the rear camera housing is moved into engagement with the front camera housing, the inner and outer electrically conductive terminals of the spring-loaded electrical connector compress towards their compressed state and, after the rear camera housing is attached at the front camera housing, are in spring-biased electrical connection with the inner and outer electrically conductive traces at the connector printed circuit board, respectively.

18. The method of claim 17, wherein, with the rear camera housing attached at the front camera housing, and with the inner and outer contact surfaces of the inner and outer electrically conductive terminals in spring-biased electrical connection with the inner and outer electrically conductive traces at the second side of the connector printed circuit board, electrical connection integrity is maintained via spring-biased direct contact of the inner and outer contact surfaces to the inner and outer electrically conductive traces without soldering at the connector printed circuit board of the inner and outer contact surfaces.

19. The method of claim 11, wherein the inner and outer electrically conductive terminals are individually spring-biased relative to the base portion via respective springs.

20. The method of claim 11, wherein the inner and outer electrically conductive traces are dimensioned to accommodate lateral tolerances to allow for lateral variations in electrical connection with the inner and outer electrically conductive terminals, respectively.

21. A method of assembling a vehicular camera, the method comprising:
providing a front camera housing, wherein the front camera housing includes a lens having a plurality of optical elements;
providing a rear camera housing having a spring-loaded electrical connector disposed thereat, wherein the spring-loaded electrical connector comprises (i) a base portion fixedly disposed at the rear camera housing, (ii) an inner electrically conductive terminal and (iii) an outer electrically conductive terminal that circumscribes the inner electrically conductive terminal and that is electrically isolated from the inner electrically conductive terminal, and wherein the inner electrically conductive terminal and the outer electrically conductive terminal of the spring-loaded electrical connector are movable relative to the base portion and are spring-biased towards an extended state and are compressible towards a compressed state;
wherein the inner and outer electrically conductive terminals are individually spring-biased relative to the base portion via respective springs;
providing a printed circuit board having an imager disposed at a first side and having an inner electrically conductive trace and an outer electrically conductive trace disposed at a second side that is opposite the first side, wherein the outer electrically conductive trace circumscribes the inner electrically conductive trace and is electrically isolated from the inner electrically conductive trace;
disposing the printed circuit board at the front camera housing and optically aligning the lens with the imager;
attaching the rear camera housing at the front camera housing to enclose the printed circuit board in a cavity formed between the front camera housing and the rear camera housing;
wherein attaching the rear camera housing at the front camera housing comprises (i) moving the rear camera housing toward engagement with the front camera housing so that the inner electrically conductive terminal and the outer electrically conductive terminal of the spring-loaded electrical connector, in their extended state, engage the inner electrically conductive trace and the outer electrically conductive trace at the printed circuit board, respectively, and (ii) attaching the rear camera housing at the front camera housing so that the inner electrically conductive terminal and the outer electrically conductive terminal of the spring-loaded electrical connector compress towards their compressed state;
after the rear camera housing is attached at the front camera housing, the inner electrically conductive terminal and the outer electrically conductive terminal of the spring-loaded electrical connector are in spring-biased electrical connection with the inner electrically conductive trace and the outer electrically conductive trace at the printed circuit board, respectively; and
wherein the spring-loaded electrical connector comprises a cable connecting end that is opposite the inner and outer electrically conductive terminals and that is configured to electrically connect to a coaxial connector of a coaxial cable of a vehicle equipped with the assembled vehicular camera.

22. The method of claim 21, wherein the base portion of the spring-loaded electrical connector is press-fit at the rear camera housing.

23. The method of claim 21, wherein the spring-loaded electrical connector is disposed at the rear camera housing via overmolding a portion of the rear camera housing over the base portion of the spring-loaded electrical connector.

24. The method of claim 21, wherein the inner and outer electrically conductive traces are dimensioned to accommodate lateral tolerances to allow for lateral variations in electrical connection with the inner and outer electrically conductive terminals, respectively.

* * * * *